June 24, 1924.
C. H. DAHL
PIPE COUPLING
Filed Sept. 13, 1923
1,499,296
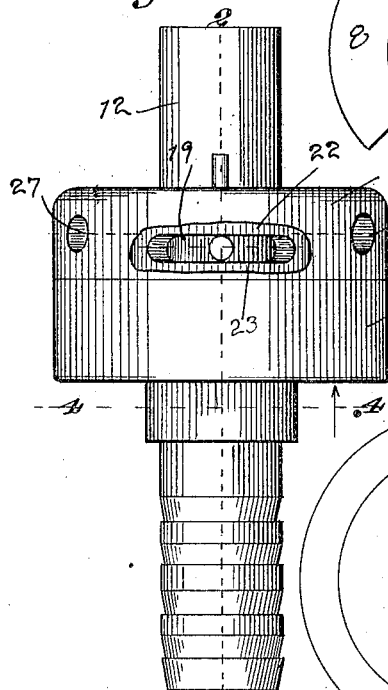
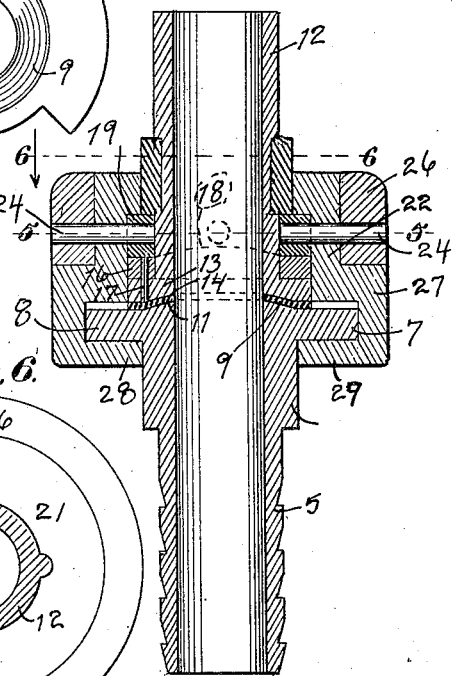
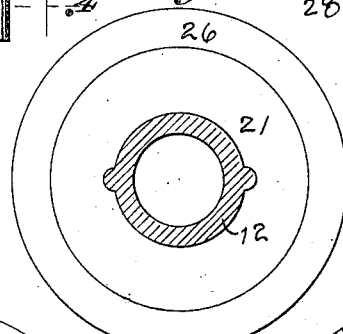
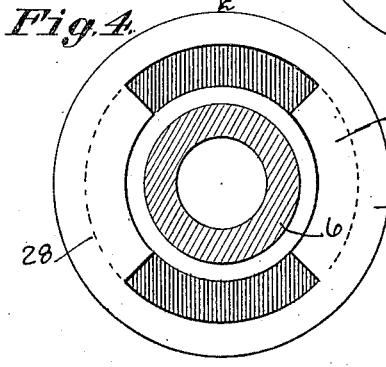
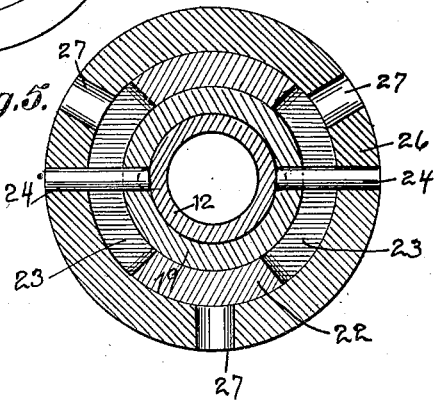
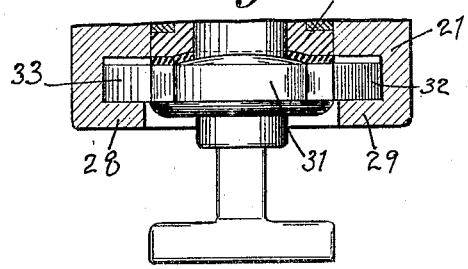
Inventor.
C. H. Dahl.
By Victor J Evans
Attorney.

Patented June 24, 1924.

1,499,296

UNITED STATES PATENT OFFICE.

CHARLES H. DAHL, OF SAN FRANCISCO, CALIFORNIA.

PIPE COUPLING.

Application filed September 13, 1923. Serial No. 662,520.

*To all whom it may concern:*

Be it known that I, CHARLES H. DAHL, a citizen of Canada, residing at San Francisco, in the county of San Francisco and State of California, have invented new and useful Improvements in Pipe Couplings, of which the following is a specification.

This invention relates to improvements in pipe couplings and has particular reference to the joining of two pipes together such as hose pipes, train pipes and the like, where it is desired to make a quick and secure joint.

The principal object is to produce a device of this character which is simple in construction and easy to operate.

Another object is to produce a device which may be employed in any place where the usual pipe joint is now used.

A still further object is to construct a coupling which will be of moderate size and therefore capable of use in places where the room is limited.

Other objects and advantages will be apparent during the course of the following description.

In the accompanying drawings forming a part of this specification, and in which like numerals are employed to designate like parts throughout the same, Figure 1 is a side elevation of my pipe coupling, partly broken away to show the interior thereof, Figure 2 is a cross section taken on the line 2—2 of Figure 1, Figure 3 is an end elevation of one of the coupling sections, Figure 4 is a cross section taken on the line 4—4 of Figure 1, Figure 5 is a cross section taken on the line 5—5 of Figure 2, Figure 6 is a cross section taken on the line 6—6 of Figure 2, and Figure 7 is a sectional detail view showing the manner of employing a plug for closing the end of one of the pipe sections, when desired.

Applicant is aware of the fact that many forms of pipe couplings have been devised. Many of these couplings, however, have been faulty for various reasons. I have therefore sought to produce a coupling which is simple, one which will cause a tight clamping of the ends of the pipe and one which may be quickly operated.

In the accompanying drawings wherein for the purpose of illustration is shown a preferred embodiment of my invention, the numeral 5 designates a section of pipe to which the customary rubber hose may be attached. It is obvious that this section might have a metallic hose secured thereto without departing from the spirit of the invention.

This pipe is connected to a coupling head 6 having wings 7 and 8 formed thereon. This head also has a convexed surface 9, which is adapted to abut a packing 11 as will be later shown.

At 12, I have shown a coupling member which coupling member is adapted to be secured to a continuing pipe in any convenient manner. This coupling member 12 is provided with a head 13 and has a recessed or concave seat 14 against which the packing ring 11 is adapted to contact. A cam 16 abuts the head 13 and is held against rotation by a pin 17. This cam ring is provided with a cam surface as shown in dotted lines at 18 (see Fig. 2).

A movable cam ring 19 also surrounds the coupling member 12 and is adapted to co-operate with the cam ring 16 as will be later shown. A casting 21 has a reduced portion 22 which surrounds the cam rings 16 and 19 and is provided with slots 23 through which pins 24 pass. These pins have their inner ends connected to the cam ring 19 and have their outer ends secured to an actuating ring 26.

Suitable openings 27 are provided in the actuating ring for the reception of a tightening tool. The casting 21 is provided with inwardly extending wings 28 and 29 which are adapted to co-operate with the wings 7 and 8 of the coupling head 6.

In Figure 7, I have shown a plug 31 having wings 32 and 33 adapted to extend beneath the wings 27 and 28 for the purpose of plugging the end of one of the pipe sections. This plug is operated by a handle 34 and the packing is placed against the same in the same manner as when a pipe section is being used.

The manner of operation is as follows:—

The head 6 is placed within the casting 21 and given a quarter turn so that the wings 7 and 8 extend beneath the wings 28 and 29 formed upon the casting. The actuating ring 26 is now rotated with the result that the pins 24 attached thereto will move the cam ring

19 over the cam ring 16. This results in forcing the head 13 and its packing 11 against the head 6, thus resulting in a tight joint between the two heads.

It will thus be seen that I have produced a simple device for accomplishing the above objects.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, a pipe section, a head formed integral therewith, said head having wings formed thereon, a convex surface formed on said head, a coupling member having a head formed integral therewith, a concave surface formed on said second mentioned head, a packing adapted to be compressed between said heads, an annular ring surrounding said coupling member and abutting said second mentioned head, means for securing said ring to said second mentioned head, a cam surface formed on said ring, a cam ring adapted to co-operate with said cam surface, a casting surrounding said second mentioned head, an actuating ring positioned on said casting, pins extending from said actuating ring through said casting and having their inner ends secured to said cam ring, and inwardly extending wings formed on said casting, said wings being adapted to overlie the wings on said first mentioned head, substantially as and for the purpose specified.

In testimony whereof I affix my signature.

CHARLES H. DAHL.